United States Patent [19]

Curtin et al.

[11] Patent Number: 4,644,489

[45] Date of Patent: Feb. 17, 1987

[54] MULTI-FORMAT BINARY CODED DECIMAL PROCESSOR WITH SELECTIVE OUTPUT FORMATTING

[75] Inventors: Richard R. Curtin, Wayland; Paul M. Clemente, Ashland, both of Mass.

[73] Assignee: Prime Computer, Inc., Natick, Mass.

[21] Appl. No.: 579,091

[22] Filed: Feb. 10, 1984

[51] Int. Cl.[4] .................................................. G06F 7/38
[52] U.S. Cl. ..................................................... 364/736
[58] Field of Search ............... 364/736, 756, 763, 781, 364/782, 783, 200, 900, 744

[56] References Cited

U.S. PATENT DOCUMENTS

| | | | |
|---|---|---|---|
| 3,299,260 | 1/1967 | Cohen | 364/783 |
| 3,535,502 | 10/1970 | Clapper | 364/783 |
| 3,571,803 | 3/1971 | Huttenhoff et al. | 364/900 |
| 3,629,565 | 12/1971 | Schmookler et al. | 364/783 |
| 3,798,606 | 3/1974 | Henle et al. | 364/200 |
| 3,935,438 | 1/1976 | Grupe | 364/771 |
| 4,139,894 | 2/1979 | Reitsma | 364/788 |
| 4,224,676 | 9/1980 | Appelt | 364/712 |
| 4,224,682 | 9/1980 | Kindell et al. | 364/200 |
| 4,323,981 | 4/1982 | Nakamura | 364/749 |
| 4,384,340 | 5/1983 | Tague et al. | 364/736 |
| 4,393,468 | 7/1983 | New | 364/736 |
| 4,442,498 | 4/1984 | Rosen | 364/749 |
| 4,454,589 | 6/1984 | Miller | 364/749 |

OTHER PUBLICATIONS

Jeremiah, "Hardware Design Enhances Direct Decimal Calculations", *Computer Design*, pp. 118–126, 130, Jun. 1980.

Miller, "Crunch BCD Numbers with Bit-Slice Chips", *Computer Design*, pp. 127–130, 132, 134, Mar., 1983.

Primary Examiner—David H. Malzahn
Attorney, Agent, or Firm—Lahive & Cockfield

[57] ABSTRACT

Digital circuitry performs arithmetic operations upon first and second binary coded decimal digit strings input thereto. The digital circuitry provides for receiving and storing a first and second BCD digit, the digits having an arbitrary data type format. The first and second data types are selected from the group of packed and unpacked data. The circuitry then performs the arithmetic operation upon the stored BCD digits to obtain a result data word which is made available in a data type format corresponding to a selected one of the input BCD digits. In a particular embodiment, a plurality of the circuits can be operated in a digit slice structure. The digit slice structure operates upon strings of packed, unpacked, and mixed data type arithmetic operands and provides, at its output lines, output data in a format corresponding to a selected input data type. In particular, a unique interconnection of the plural output lines of the circuitry enables the output data type to be packed or unpacked as desired. The circuitry also provides for automatic selection of digits applied to the circuitry thereby relieving the operating environment from significant time consuming and costly supervision.

12 Claims, 6 Drawing Figures

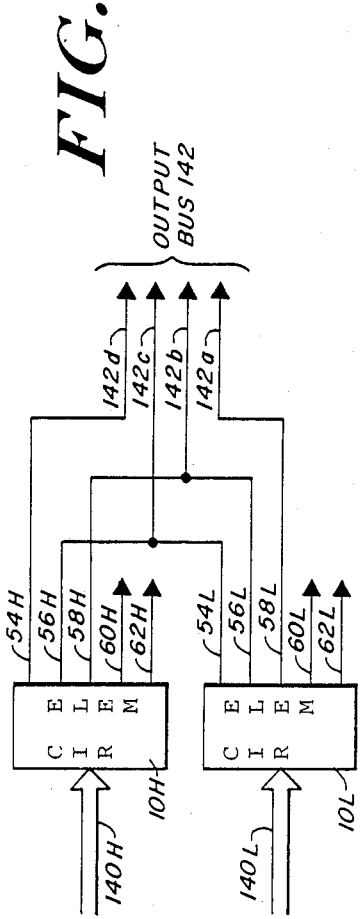

| PACKED | | UNPACKED | |
|---|---|---|---|
| ELEMENT 10L | ELEMENT 10H | ELEMENT 10L | ELEMENT 10H |
| OUTPUT 54 | OUTPUT ENABLED (IF SELECTED DESTINATION COUNT IS "101", OUTPUT IS ALU RESULT; IF "111", OUTPUT FROM LATCH 46) | OUTPUT TRISTATED | OUTPUT TRISTATED | OUTPUT ENABLED OUTPUT IS "B" IF ALU CONTROL IS ADD OR SUBTRACT, ELSE OUTPUT IS FROM LATCH 46 |
| OUTPUT 56 | OUTPUT TRISTATED | | OUTPUT ENABLED OUTPUT IS "B" IF ALU CONTROL IS ADD OR SUBTRACT, ELSE OUTPUT IS FROM LATCH 46 | OUTPUT ENABLED OUTPUT IS ALU RESULT OR OUTPUT OF LATCH 34 (IF ALU IS IN TRANSPORT MODE) |
| OUTPUT 58 | OUTPUT ENABLED (IF SELECTED DESTINATION COUNT IS "101", OUTPUT IS FROM LATCH 46, IF "111" OUTPUT FROM ALU 52) | | OUTPUT ENABLED OUTPUT IS ALU RESULT OR OUTPUT OF LATCH 34 (IF ALU IS IN TRANPORT MODE) | OUTPUT TRISTATED |

| NIBBLE SELECT CODE | NIBBLE LATCHED IN LATCH 34 OR LATCH 36 | | |
|---|---|---|---|
| | CIRCUIT 10L | CIRCUIT 10H | |
| 000 | LINES 12 | LINES 26 | |
| 001 | LINES 14 | LINES 12 | |
| 010 | LINES 16 | LINES 14 | |
| 011 | LINES 18 | LINES 16 | DATA TYPE = PACKED |
| 100 | LINES 20 | LINES 18 | |
| 101 | LINES 22 | LINES 20 | |
| 110 | LINES 24 | LINES 22 | |
| 111 | LINES 26 | LINES 24 | |
| 000 | LINES 14 | LINES 26 | |
| 001 | LINES 14 | LINES 26 | |
| 010 | LINES 18 | LINES 14 | |
| 011 | LINES 18 | LINES 14 | DATA TYPE = UNPACKED |
| 100 | LINES 22 | LINES 18 | |
| 101 | LINES 22 | LINES 18 | |
| 110 | LINES 26 | LINES 22 | |
| 111 | LINES 26 | LINES 22 | |

*FIG. 4*

| | SOURCE COUNTER | | DESTINATION COUNTER | |
|---|---|---|---|---|
| | PRESENT NIBBLE SELECT CODE | NEXT NIBBLE SELECT CODE | PRESENT NIBBLE SELECT CODE | NEXT NIBBLE SELECT CODE |
| P A C K E D | 000 | 110 | 111 | 101 |
| | 110 | 100 | 101 | 111 |
| | 100 | 110 | | |
| | 111 | 101 | | |
| | 101 | 111 | | |
| U N P A C K E D | 001 | 101 | 111 | 111 |
| | 101 | 101 | | |
| | 111 | 111 | | |

*FIG. 5*

| | NIBBLE SELECT CODE | NIBBLE STORED IN LATCH 46 | |
|---|---|---|---|
| | | HIGH SLICE | LOW SLICE |
| P A C K E D | 000 | ALL 1'S | ALL 1'S |
| | 001 | ALL 1'S | ALL 1'S |
| | 010 | ALL 1'S | ALL 1'S |
| | 011 | ALL 1'S | ALL 1'S |
| | 100 | ALL 1'S | ALL 1'S |
| | 101 | LINES 24 | LINES 26 |
| | 110 | ALL 1'S | ALL 1'S |
| | 111 | LINES 20 | LINES 22 |
| U N P A C K E D | 000 | ALL 1'S | ALL 1'S |
| | 001 | — | — |
| | 010 | ALL 1'S | ALL 1'S |
| | 011 | — | — |
| | 100 | ALL 1'S | ALL 1'S |
| | 101 | — | — |
| | 110 | ALL 1'S | ALL 1'S |
| | 111 | LINES 20 | LINES 24 |

*FIG. 6*

MULTI-FORMAT BINARY CODED DECIMAL PROCESSOR WITH SELECTIVE OUTPUT FORMATTING

BACKGROUND OF THE INVENTION

The invention relates generally to data processing apparatus and in particular to an apparatus for processing decimal digits.

Data processing apparatus operate according to a binary arithmetic, and generally process numerical data by converting the data to a binary number representation. Programming languages, such as COBOL, however, execute a large number of decimal instructions and therefore, if the data is to be processed as a binary number, each decimal string of binary coded decimal (BCD) represented decimal digits must be converted to a pure binary number, operated upon, by for example the arithmetic unit of the machine, and then converted back to its original (or a different) BCD representation. This is a time consuming task. Furthermore, where decimal data is commonly output, the conversion can introduce undesirable round off errors which occur because of the decimal to binary to decimal conversion. To avoid this, the decimal data can be stored and manipulated as either packed or unpacked binary coded decimal (BCD).

The problem of increasing the throughput in a digital processing apparatus which processes large quantities of decimal data has been generally approached by using special decimal processing hardware or a combination of hardware and software methods. Thus, there exist arithmetic processors which operate upon BCD data and provide BCD data at their output. These processors however are limited to a specific type of packed or unpacked BCD data and are thereby limited to an operating environment in which the input data can be either packed BCD or one of several classes of unpacked BCD data. The output is typically of the same class as the input data class.

In order to accommodate various classes of BCD input and output data, therefore, several "super-minicomputers" have employed microcode algorithms to handle the various standard types of packed and unpacked BCD data. However, the use of microcode algorithms inherently reduces the throughput of the apparatus and therefore limits the performance of the apparatus for handling BCD data.

Objects of the invention are therefore an increased processing throughput while handling both packed and unpacked BCD data, improved flexibility in handling arithmetic operations using BCD data without converting the data to a pure binary representation, a compact and reliable VLSI chip structure for providing a hardware implementation for decimal arithmetic, and a hardware implementation for decimal arithmetic which minimizes the use of microcode for its implementation and operation.

SUMMARY OF THE INVENTION

The invention relates to digital circuitry for performing arithmetic operations on binary coded decimal digits. The digital circuitry features a multiplexing and storage circuitry for receiving and storing a first BCD digit from an input word having a first data type format and for receiving and storing a second BCD digit from a data word having a second data type format. The first and second data words can be the same or different and the data type formats can be the same or different. The available formats are packed data and unpacked data formats. The invention further features an arithmetic circuitry for performing arithmetic operations upon the stored BCD digits to obtain a result data word and circuitry for outputting the result data word according to the data type format of the second BCD digit.

More particularly, the apparatus employs a source latch for storing the first data nibble and a destination latch for storing the second data nibble. The apparatus further features circuitry responsive at least to a source input data type for specifying the first data nibble or BCD digit and at least a destination input data type for specifying the second data nibble or BCD digit. After the arithmetic operation on the stored BCD digits takes place, the result is placed on the output lines in accordance with the destination input data type.

More specifically, the apparatus features a source nibble select counter, a destination nibble select counter, means for initializing the counters, and circuitry for incrementing the counters according to a respective predetermined, data type dependent, transition sequence. The specifying circuitry is then further responsive to at least outputs of the source and destination counters for specifying the first and second data nibbles respectively.

In another aspect, there is featured a digit slice apparatus for performing arithmetic operations upon strings of binary coded decimal digits. The digit slice apparatus features at least a first and a second arithmetic circuit element, each element being capable of operating upon strings of packed, unpacked, and mixed data type arithmetic operands. Each circuit element further has circuitry responsive to the position of the element in the digit slice apparatus for selecting digits from input words having a plurality of digits for arithmetic computation thereon. The circuit elements further feature a plurality of output line groups, the number of output line groups being greater than the number of output line signal groups which will form the output of the circuit during a clock cycle, and circuitry for interconnecting at least two output line groups of the first circuit element with two output line groups of the second circuit element for providing a multidigit output word from the apparatus. The apparatus further has circuitry for formatting the output data to correspond to the data type format of a specified input word, the circuitry being responsive not only to the data type format but to the circuit position of the digit slice apparatus for applying the formatted output data to the output lines.

BRIEF DESCRIPTION OF THE DRAWINGS

Other objects, features, and advantages of the invention will be apparent to those skilled in the art from the following description taken together with the figures in which:

FIG. 2 is a system array of two decimal arithmetic circuits operating in a BCD digit slice mode for providing multiple arithmetic digit execution during a single instruction cycle and showing the interconnection of the outputs of the circuits;

FIG. 3. is an output selection table illustrating the output nibble operation of the decimal arithmetic circuit in a digit slice configuration;

FIG. 4 is a table illustrating correspondence between the source and destination counter states and the selected input lines according to the preferred embodiment of the invention;

FIG. 5 is a table illustrating the source and destination counter sequencing; and FIG. 6 is a table illustrating the correspondence between the destination counter output and the nibble stored in the transfer latch.

DESCRIPTION OF A PREFERRED EMBODIMENT OF THE INVENTION

Figure 1:
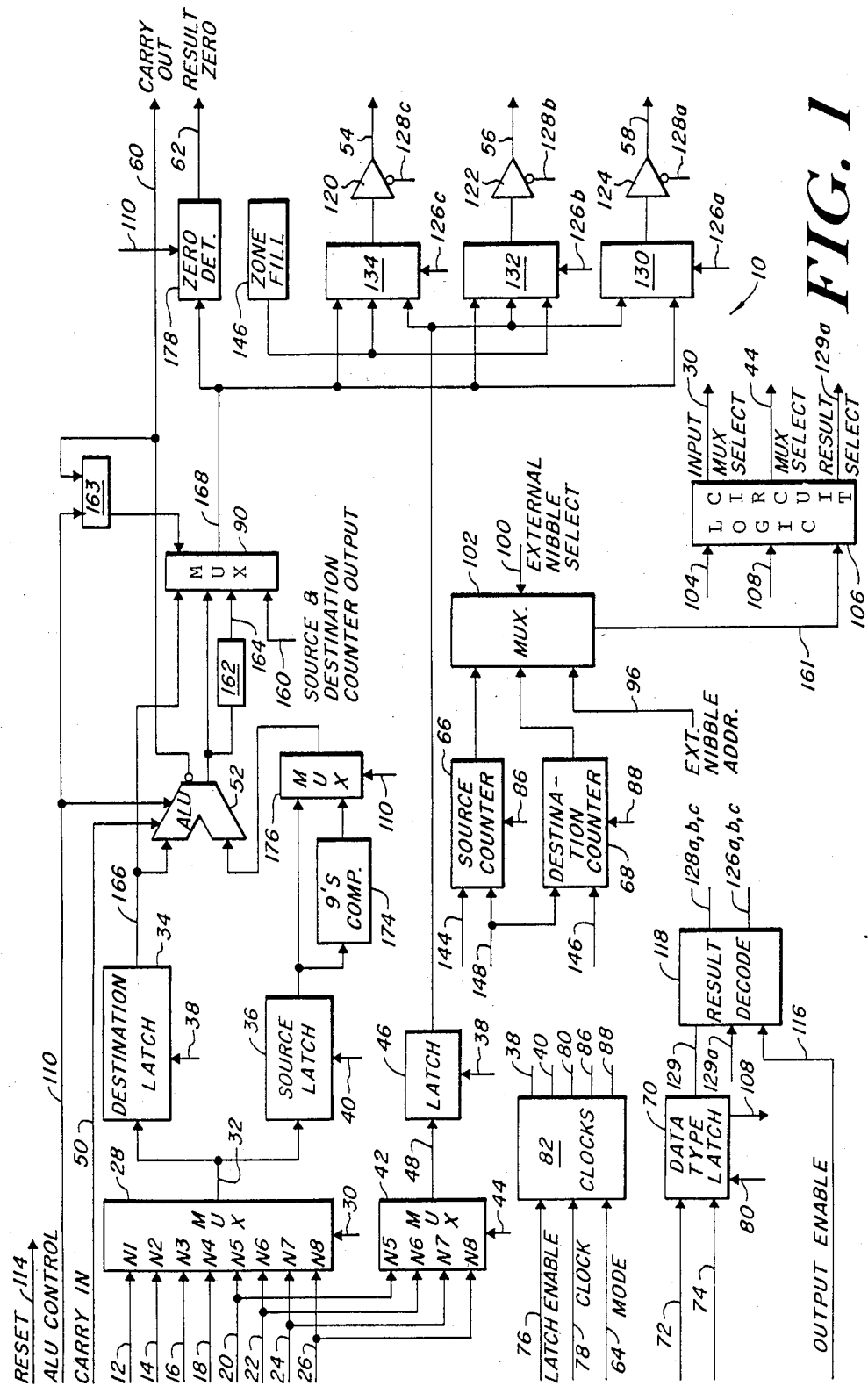
FIG. 1 is an electrical block circuit schematic of a decimal arithmetic circuit according to the invention.

According to the invention, an apparatus 10 is capable of operating upon two classifications of decimal input data types, a packed data type and an unpacked data type.

The packed data type has a decimal digit represented in four bits (also called a BCD nibble) with the sign for an entire string of digits being the least significant nibble of the string. The packed data type is here restricted to consist of an odd number of digits (not including the sign) and can begin or end on a byte or word boundary. When the nibble having the sign is added to the decimal string, the string always ends on a byte boundary.

Unpacked data can be broken down into two sign types separate or embedded, and each of these sign types can have the sign either as a leading sign or as a trailing sign. The unpacked data types each use eight bits (two nibbles or one byte) of data to represent a digit (and for the separate sign type, an additional byte to represent the sign). The unpacked data type string can begin on a byte or word boundary.

The leading separate or trailing separate data types begin or end respectively with a sign byte. The most significant or upper nibble of the sign byte is called the zone portion and for a sign character, the zone is a hexadecimal "A". The data portion of the sign byte, the lower nibble, has either a hexadecimal "B" or "O" for the positive sign and a hexadecimal "D" for the negative sign. The remaining bytes of the separate data types each represent one decimal digit, the low nibble of the byte representing the decimal digit (in four bits) and the upper nibble, the zone nibble, being a hexadecimal "B".

The embedded sign data type, like the separate data type, can have a leading or a trailing sign. The embedded data type provides the sign and data embedded together in the same byte of information. Thus the embedded data type uses one less byte than the separate data type but it is, generally, more complex to retrieve the correct sign and digit value from the embedded sign byte.

General Operation and Structure

Referring now to FIG. 1, the decimal arithmetic circuit 10 has a plurality of both control input and data input lines. The illustrated data input port is a thirty-two bit wide port broken down into eight four-bit nibbles, numbered N1 through N8, with the nibble N1 being the most significant nibble and nibble N8 being the least significant nibble. Nibbles N1–N4 make up the high word while nibbles N5–N8 make up the low word of the data input. Thus, lines 12 carry nibble N1, lines 14 carry nibble N2, lines 16 carry nibble N3, lines 18 carry nibble N4, lines 20 carry nibble N5, lines 22 carry nibble N6, lines 24 carry nibble N7, and lines 26 carry nibble N8. The data input word is received at an input multiplexor 28 which selects one of the eight input nibbles, as controlled by an input multiplexor select line 30.

The four-bit output of the multiplexor over lines 32 is received by a destination input latch 34 and a source input latch 36. Latch control signals over lines 38 and 40 control the storage of the input data for latches 34 and 36 respectively. The four low order nibbles of an input word are also directed to a second multiplexing element 42 which selects one of the input nibbles under the control of signals over multiplexor select line 44. A transfer latch 46 receives and stores the selected output of multiplexor 42 which is made available over lines 48.

The data input to the circuitry also includes a carry-in bit available over a line 50. The carry-in input bit provides a decimal arithmetic logic unit (ALU) 52 with a carry-in value for addition and a borrow value for subtraction.

The control of the decimal circuit comes from three groups of control inputs: inputs used to generate control signals over line 30 for selecting the input nibble from the one of eight input select multiplexor 28, control inputs for specifying the operating mode of the circuit, and in particular the arithmetic logic unit, and control inputs for deriving the signals which enable the output circuitry and provide output data over output lines 54, 56, and 58. Each output of lines 54, 56, and 58 is four bits wide. The outputs of the element further include a carry-out output over a line 60 and a result equals zero (REZ) output from a zero detector 178 over a line 62.

The circuitry 10 can operate in any one of four operating modes. The mode of operation is selected by the state of the two input mode control bits provided over lines 64. In Mode ONE, a source nibble select counter 66 and a destination nibble select counter 68 are initialized, the data types are stored in a data type latch 70 in accordance with a source identifying packed/unpacked bit at bit 15 of the high word available at the input port, and a destination data type identifying packed/unpacked bit at bit 15 of the low word available at the input port. This data is available to the data type latch 70 over lines 72 and 74 respectively. The data type latch output is reponsive to the data type inputs over lines 72, 74, and the latch 70 stores the data types upon the occurrence of the clock generator clock output over line 80 which is derived from the clock signal over line 78.

Other inputs to the circuitry 10 in Mode ONE include a latch enable signal over a line 76 and a clock signal over a line 78. The latch enable signal over line 76 provides the enabling clock signals on lines 38 and 40 as well as a latch enable for latch 46 over a line 80. In addition, a clock generation circuitry 82 provides over clock lines 86 and 88, clock signals for loading the nibble select counters 66 and 68 respectively. The three-bit outputs of the illustrated nibble select counters are one of the inputs which will determine which input nibble will be read into the four-bit wide latches 34 and 36 from the thirty-two bit wide input port.

In Mode TWO, the circuitry 10 increments the two three-bit nibble select counters 66 and 68 to their next state as described in more detail below. In addition, the values in the source and destination nibble select counters 66 and 68 are made available at the output of the apparatus, over one of lines 54, 56, 58 in place of, for example, the ALU output. This operation, as is also described in more detail below, is effected using a multiplexor 90. The incrementation of the destination and source nibble select counters by signals over lines 86 and 88 from clock generator 82 is controlled using the clock input signal over line 78 during this second mode of operation.

During Mode THREE, the circuitry 10 is enabled to latch a source digit, selected from the thirty-two bit input word by multiplexor 28, in the source input latch 36. This digit will be employed in an arithmetic operation. The selected digit control signal is derived either using the three-bit source address code supplied from an external source as an input over lines 96 or from the source nibble select counter 66 output. The source of the address code is controlled by an external nibble select signal over a line 100 to a multiplexor 102. The output of multiplexor 102, in combination with a high/low input over a line 104, the high/low input designating the position of the circuitry 10 in a digit slice mode of operation as will be described in more detail below, enables a logic circuit 106 to determine the nibble to be selected from the input word for storage in the source latch 36. The input select signal is available over select lines 30. The externally generated latch enabling signal over line 76 is used by clock generator circuit 82 to generate the control signals over line 40 for latching the selected digit into the source latch 36. The clock input over line 78 and the mode input over line 64 are employed for incrementing the source nibble select counter 66 to its next state by a clock pulse over line 86.

In Mode FOUR, two different nibbles presented on the thirty-two bit input data lines are stored. One nibble to be stored is the destination digit that will be stored in the destination latch 34 and which will typically be employed in an arithmetic operation. This digit is stored in the destination latch 34 when the latch enable signal over line 38 is generated. The destination latch enable signal over line 38 is generated in response to the latch enable and mode designation signal inputs to clock circuitry 82. The selection of this destination nibble is carried out as described in connection with the Mode THREE source nibble selection and the three-bit address select code is derived from either from the external address available over lines 96 or from the output of the three-bit destination counter 68.

The other nibble, which is to be stored in transfer latch 46 during the fourth mode of operation, is required to allow the circuitry to, for example, transfer or pass an unused packed digit, unchanged, through to the output of the apparatus, or to transfer or pass the high nibble of an unpacked byte, the low order nibble of which, for the unpacked data type, is being stored in the destination latch 34. The high nibble of the byte will then be available at the output of latch 46. The selection of the nibble to be stored in latch 46 is controlled, as noted above, by the output signal over lines 44 from logic circuit 106. Circuit 106 is responsive to the high/low signal over input line 104, the three-bit nibble select code from multiplexor 102 and the destination data type, indicated as an input to, and stored in, the data type latch 70 and available over line 108.

The enable latch signal over line 76 is employed to latch these two nibbles in latches 34 and 46 by an enable signal over lines 38; and the clock signal over line 78 provides the clock signal to increment the destination nibble select counter 68 to its next state.

The outputs of the circuitry 10, as described above, include three four-bit nibbles over output lines 54, 56, and 58, the result equals zero signal over line 62, and the carry-out bit over line 60. As will be described in further detail below, only two of the three available four-bit output nibbles are employed at one time, the output nibbles being used to drive, in combination with a second identical circuitry 10 in a digit slice configuration, a sixteen-bit wide data channel. This operation is described in more detail below.

The arithmetic operation of ALU 52 is controlled by ALU control bits provided over lines 110. The ALU control bit signals define the ALU operation. The ALU operations include (a) the addition of the data stored in the destination data latch 34, the source data latch 36, and the carry-in over line 50; (b) subtracting, from the data stored in the destination latch, the data stored in the source latch 36 and the carry-borrow available over carry-in line 50; (c) the transport of the destination data of latch 34 to the arithmetic multiplexor 90 while allowing the recognize zero logic 178 to function; and (d) the forcing of the result equals zero line 62 to a logical active recognition state independent of the output of multiplexor 90.

A reset signal provided over a line 114 to the apparatus 10 forces the source and destination digit latches 36, 34 and the transfer nibble latch 46 to an all "one's" state. The reset also forces the source nibble select counter and the data type latches to all zeroes and the destination nibble select counter to a "one-zero-one" state.

There is also provided as an external input to the circuitry 10, an output enable signal over a line 116. The output enable signal controls, through an output result decode circuitry 118, the output tristate drivers 120, 122, and 124. When "not enabled", each output driver is forced to a high impedance state. When the output enable signal to a driver over a line 128a, 128b, or 128c is in an enabled state, the output driver responds by driving the output lines with the output of the corresponding output result multiplexing element 130, 132, 134. The enabling signals over lines 128a, 128b, and 128c are generated by the result decode circuitry 118 in response to the output enable signal over line 116, the output of the data type latch 70 over a line 129, and a result select output 129a of logic circuitry 106. The result select output is responsive to the destination nibble select count from multiplexor 102, the destination data type over line 108, and the high/low signal over line 104, for providing signal data for generating output enabling signals 128a, 128b, 128c.

The output of the data latch 70 is also employed by output result decode circuit for deriving output select signals over lines 126a, 126b, and 126c. The output select signals over lines 126a, 126b, and 126c control the selection of the output signal for the respective multiplexing elements 130, 132, and 134 from their respective inputs.

Digit Slice Mode

Referring now to FIG. 2, the decimal arithmetic circuit 10 is typically employed in a decimal digit slice mode of operation wherein an array of circuit elements 10 jointly cooperate to process a plurality of decimal digits during an operation cycle. While the array can be of substantially any length, it is preferred to employ two elements to perform two arthimetic operations during each operating cycle, in accordance with the digit slice structure illustrated in FIG. 2. Referring to FIG. 2, the circuitry 10 operating upon the lower order digit pair, the least significant digit pair, is designated by the reference number 10L and the lines associated therewith also have the suffix "L" attached thereto. Correspondingly, the circuitry 10 operating upon the higher or more significant digit pair is designated by the reference number 10H and the lines associated therewith have the suffix "H" attached thereto. The circuits 10H and 10L receive input data and control lines over input lines 140H and 140L. The output lines of circuits 10H and 10L are designated 54H, 56H, and 58H for the nibble output lines of arithmetic circuit 10H; 54L, 56L, and 58L for the nibble output lines of arithmetic circuit 10L; and 60H, 60L, and 62H, 62L for the carry-out and result-equals-zero lines respectively. The two digit operation provided by arithmetic circuits 10L and 10H drive a sixteen bit wide output bus 142. The nibble outputs 54, 56, 58 of the circuits 10 are, as noted above, each tristate outputs and are interconnected to provide data types on the bus output lines which match the destination input data type.

The three four-bit nibbles available over output lines 54, 56, and 58 are, as noted above, tristate outputs and are enabled using the signals over lines 128a, 128b and 128c. As described in more detail below, the interrelationship between the nibbles and the output bus in the two digit slice configuration of FIG. 2 requires that each circuit 10L, 10H provide two nibbles or a byte of output to the system bus. The value actually output on the bus is determined by the combination of the signal level over high/low line 104 which determines whether the element is the high or low element of a digit slice pair and the value of the ALU control signal over lines 110, the nibble select code, and the destination data type. The determination is summarized in FIG. 3.

More particularly, a non-enabling signal level input over lines 118 to circuitry 10, forces all twelve output lines 54, 56, 58 of the arithmetic circuit 10 to a high impedance state. When the output enable line 118 is enabled, indicating an output enabled state, the signal control for each output line 54, 56, and 58, over lines 126a, 126b, 126c, is established by control of the result multiplexors 130, 132, 134 using (a) the high/low signal over line 104 (indicating the position of the circuit in the decimal slice configuration of FIG. 2), (b) the nibble select code either provided to the circuitry from an external source over lines 96, or from the destination nibble select counter 68, and (c) the value of the destination data type from latch 70. Thus for example a hexadecimal "B" from a zone fill element 146 (FIG. 1) can be output as the zone nibble when the destination data type is unpacked.

Referring again to FIG. 2, the interconnections of the output nibbles over lines 54H, 54L, 56H, 56L, 58H, and 58L provide the necessary output data flexibility for providing packed or unpacked data over the output bus 142. The table of FIG. 3 describes the status of the output lines for different combinations of external and internal control signals. The result, as noted above, is to provide data on output bus 142 which is of the same data type as the destination data type. If the destination data type is packed, the data on output bus 142 is packed and if the destination data type is unpacked, the output on data bus 142 is unpacked.

Source and Destination Latch Loading

The circuitry which selects the data for storage in the destination and source latches will now be described in greater detail. The destination and source latches 34, 36 respectively are loaded from the input word, available over lines 12–26, through multiplexing element 28. The multiplexing element 28 is in turn controlled by an input signal over lines 30, designated the input multiplexor select signal. This signal is derived in part from a selected one of the source and destination counters 66, 68 respectively, (or an external nibble address provided over lines 96) by controlling the multiplexor 102 through an external nibble select line 100. The output of the multiplexor 102 is a three-bit address which, in combination with the high/low (HL) signal over line 104 and the data type over line 108, is processed by logic circuitry 106 to produce the multiplexing control signals over lines 30 and 44. (As noted above, the multiplexing signals over lines 44 select the output of a four-to-one input multiplexor 42 connected to the lower four nibbles of the input word.)

The control signals over lines 30 designate one of the eight input nibbles as the output of the multiplexor. For convenience of description, the nibbles of the input word can be numbered, in binary, so that nibble N1 over line 12 is designated by the binary count "000", nibble N2 over line 14 by the binary count "001", and so on until the nibble N8 over line 26 is designated by the binary count "111". Referring to the table of FIG. 4, the output counts of the source nibble select counter 66, the destination nibble select counter 68, or the external nibble address input over lines 96, will not generally be identical to the selected nibble designated over lines 30. Thus, depending upon the position of the arithmetic circuit in the digit slice configuration, that is whether it is the low digit slice circuit (the high/low signal over line 104 equals binary 0) or a high digit slice circuit (the high/low signal over line 104 equals binary 1), and depending upon the data type, the nibble selected for storage in the latch 34 or 36 will vary. Note that when the data is packed, each of the eight possible nibble select codes from multiplexor 102 corresponds to a different nibble of the input word. When the data is unpacked, however, only the low order nibble of a byte provides a decimal digit. This is reflected in FIG. 4 where only alternate nibble select codes correspond to different input lines and hence valid unpacked data.

It is important to further note that in the digit slice configuration illustrated in FIG. 2, the circuitry 10 automatically provides for operating upon successive digits of input data. Thus, for a nibble select code of "111", for the packed data type, the least significant nibble of the input word over input lines 26 is selected by the low order circuit 10L and the next to least significant nibble over lines 24 is selected by the higher order circuit 10H. Similarly, for unpacked data and a nibble select code of 110, circuitry 10L selects the least significant nibble on lines 26 and the circuitry 10H selects the next least significant nibble over lines 22.

Transfer Operation

In typical operation of the arithmetic circuit 10, it is often necessary to pass one input nibble through the circuit unaltered, while performing an arithmetic operation upon another input nibble. The capability of passing data which will not be used in an arithmetic operation through the circuitry 10 in unaltered form, is provided by multiplexing element 42 and transfer latch 46 in combination with the operation of the output multiplexing elements 130, 132, 134, and output drivers 120, 122, 124. Thus, for example, when the configuration of FIG. 2 is operating with packed data, and referring also to FIG. 3, the output of driver 122 on lines 56, for both the high and low circuits 10H and 10L, is not enabled and is tristated. Thus, referring to FIG. 2, the output over lines 58H, which are tied to lines 56L, and the outputs over lines 54L, which are tied to lines 56H, control, and will appear over the output bus lines 142b and 142c respectively. Furthermore, according to the table of FIG. 3, the output signals selected by multiplexors 134 and 130 for delivery over lines 54 and 58, respectively, will, for packed data, depend upon the nibble select code of the destination nibble select counter.

Thus, for example, if the data is packed and the destination select count is "101" relating, from FIG. 4, to the nibble over lines 22 for the lower digit slice and lines 20 for the upper digit slice, the result (using the FIG. 3 table) of the lower digit slice arithmetic operation will be presented over output lines 142c (from lines 54L) of the output bus and the output of the high digit slice arithmetic operation will be provided over lines 142d (from lines 54H) of the output bus. The output over lines 142a and 142b respectively, for a destination count of "101", is the output from the transfer latch 46 available over lines 58 (FIG. 3). This output is selected by the output multiplexor 130. Latch 46 will respectively contain, as controlled by multiplexing element 42, the input nibble over lines 26 for the low order digit slice, and the input nibble over lines 24 for the high order digit slice (see FIG. 6). Thus the sixteen-bit wide output bus 142 repeats on lines 142a and 142b, the unused input data on lines 26 and 24 respectively, and replaces the destination source data (lines 22 and 20) with the arithmetic results (on lines 142c and 142d respectively).

Correspondingly, if the destination nibble select count were "111", for a packed data type, the outputs over lines 58 and hence over bus lines 142a and 142b are the results from the respective ALU's arithmetic operations, while the outputs over lines 54 are the respective outputs of the transfer latch 46. Thus, the input nibbles over lines 22 and 20 are passed unaltered to lines 142c and 142d respectively, and the output over lines 142a and 142b corresponding to the destination address position of the data input to the circuits, are the outputs of the respective ALU's.

A corresponding transfer and alignment of data occurs with respect to the unpacked data type. In this instance however, the apparatus must have more flexibility to provide over output lines 56L and 54H respectively, either a zone nibble for unpacked data during an ALU add or subtract, or the output of latch 46 where the ALU operation is other than an add or subtract. For the unpacked data type, referring again to FIG. 3, the output of circuit 10L over line 58L during an add or subtract is always the output of the ALU; that is, the result of the ALU operation must be placed in the low order nibble of the byte (i.e. over lines 142a). If the circuit 10L is being employed to transfer data through the circuit, the output of destination latch 34 can be directly applied to output lines 58L using the multiplexing element 90. Similarly, the output of the destination latch of circuit 10H can be directly applied to output lines 56H using the multiplexor 90. Thus, if the destination data is unpacked, the result of an ALU add or subtract operation appears on output lines 142a and 142c with the zone bits appearing on lines 142b and 142d respectively. If no arithmetic operation is being performed, then the output over lines 142b and 142d will result from the latch 46 while the output over lines 142a and 142c will result from either destination latch 34 or the source and destination nibble select counter outputs, as selected by multiplexing element 90.

Destination and Source Counter Sequencing

As noted above, the source and destination nibble select counters 66 and 68 respectively each provide a three-bit count for selecting the decimal digits to be processed. Thus, for example, if the source data type is packed, assuming that the input is a decimal field which is word-aligned, the sign of the decimal string will be found in the least significant nibble (available over lines 26) and the least significant digit will be available over lines 24. During the first pass through the circuitry 10H, 10L, the respective counters select the digits over lines 22 and 24 to be processed. To select the next set of digits, it is necessary to change the nibble select code, available from the counters, from their present count to a count which selects the nibbles available over lines 18 and 20. If the external software were to provide this function for all passes through the decimal fields, it would require one step to create the new select code and a second step to load it into the control register. That procedure is quite time consuming. The counters are therefore configured to alleviate the need for the software or firmware to create the select codes each time as the arithmetic operations are performed, sequentially, on each digit of the digit string. Each counter is therefore designed to count in accordance with the associated data type and provides, automatically, a sequence of three-bit counts for stepping through the input words.

In operation, each counter 66, 68 can be loaded in Mode ONE with a starting nibble select code using the clock over line 78 for generating clock outputs over lines 86, 88, respectively, as described in detail above. The counts to be loaded are available over lines 144, 146 and the determination that the circuitry is operating in Mode ONE is available over lines 148. Preferably, the input data over lines 144, 146 is available over input lines 20.

During Mode TWO, a pulse on the clock pin 78 will increment both the source and destination counters to their next state. (The counts of the counters 66, 68 are also available, in inverted form, to the circuitry output multiplexors from the multiplexor 90 which can be controlled to select the counter outputs available over lines 160.) Thereby, the three-bit source nibble select counter value can be output on the three most significant bits of a result nibble and the middle bit of the illustrated destination nibble select counter can be output on the least significant bit of the same result nibble. (In the illustrated embodiment, the first and third bits of counter 68 are constrained to be "1".) When the circuitry is operating in Mode THREE, a pulse on the clock input line 78 will act to increment the source nibble select counter 66; while if the circuitry is operating in Mode FOUR, a pulse on the clock input line 78 will increment the destination counter.

Referring to FIG. 5, the transitions from one nibble select source or destination counter state to a next counter state is detailed. Note that in the specific embodiment employed herein, the destination counter 68 is in essence a one bit counter, the two possible output counts being "101" and "111". This occurs since in the particular embodiment disclosed, the destination data will be provided only in the lower half of a thirty-two bit input word and thus the counter is limited to selecting destination data only from the low half of the input word, that is from lines 20, 22, 24, and 26. In other embodiments of the invention, the destination counter can be a full three-bit counter comparable to the source counter, and the transition table of FIG. 7 (and other affected tables) would be modified accordingly.

Source, Destination, and Transfer Latch Operation

The source and destination digits are latched in the source latch 36 and destination latch 34 during Mode THREE and Mode FOUR, respectively. Referring to FIG. 4, and as noted above, the determination of which nibble is selected depends in major part upon the value of the three-bit code coming from either the respective nibble select counters or from the external nibble address available over lines 96 if the external nibble select signal over line 100 is enabled (low). The selected input nibble also depends upon the value of the HL signal over line 104 and the data type of the input signal, as noted above. The particular selected nibble is then gated onto multiplexor output lines 32 and that data nibble is then latched into the latch 34 or 36 by the control signals over lines 38, 40 respectively. The particular latch is selected using (a) the mode pin values over line 64 in combination with the latch enable over lines 76 to generate the latch control signal over line 38 or 40.

During Mode FOUR, when the double word input from which the destination nibble will be selected, is presented to the circuit 10, the second nibble is selected and stored in transfer latch 46. This second selected nibble will not be used in the arithmetic operation, but nevertheless can be required to complete the data presented to the output bus 142, that is, to complete an output byte which will be returned to memory or a register file of the data processing system.

In the illustrated embodiment in FIG. 2, each digit slice must supply two nibbles to output bus 142. The nibbles appear on the bus either adjacent, for unpacked data, or in alternate form, that is, separated by a nibble of the other digit slice circuit, for packed data. A nibble, which is not used in the arithmetic operation, but which is stored in transfer latch 46 using the same clock timing signal on line 38 as employed in connection with destination latch 34 can be one of the two required output nibbles. The latch 46 receives the output over lines 48 from the one-to-four multiplexor 42 whose inputs, as noted above, are the low order nibbles of the input word. The select logic signal over lines 44 nibbles of the input word. The select logic signal over lines 104, the destination counter latch value (or external nibble address) over lines 161, and the data type value over lines 108 (indicating whether the destination nibble is in a packed or unpacked format). The selection table relating the selected nibble (or an internally generated nibble having all "1"'s) to a nibble code, is illustrated in FIG. 6.

ALU Operation

In the illustrated embodiment, the output result available to output multiplexors 130, 132, 134, from multiplexor 90 (controlled primarily by the ALU control signals over lines 110) represents either the output of the decimal ALU 52 (which is a binary adder), the output of an adjust logic 162 over lines 164, the output of the destination latch 34 over lines 166, or the nibble select counter outputs over lines 160 as noted above. The decimal ALU 52 supplies a four-bit BCD digit which represents the arithmetic result called for by the control signals over lines 110. The adjust logic 162 provides an alternative to the normal output of the ALU which is used when the sum of the source and destination digits (and the carry-in) exceeds decimal "9". The resulting carry forces the multiplexor 90, through a multiplexor control circuit 163, to select the output of adjust logic 162 rather than the ALU output. The adjust logic output equals the binary representation from the ALU (a number greater than nine) minus decimal "10" (the carry is already available over lines 60).

Decimal addition in the ALU is carried out by adding the two BCD digits available from latches 34 and 36, together with the value of the carry-in, if any. The four-bit adder is thus used together with the adjust logic 162 to provide a valid BCD result.

Decimal subtraction is carried out using the ALU adder 52 by taking the nine's complement of the digit in the source latch 36, using a nine's complement circuit element 174 and adding that complemented value to the sum of the value in the destination latch 34 and the borrow-in available as the carry-in over line 50. The nine's complement from element 174 is selected using an ALU source multiplexor 176 controlled by ALU control signals over lines 110. The borrow-out signal (the carry-out over line 60) has a "one" value representing a borrow to the next digit.

When decimal subtraction is carried out by the addition of the BCD value in the destination latch, the nine's complement of the BCD value in the source latch, and the value of the carry-in signal, if the destination digit is less than the source digit, the four-bit BCD output of the ALU is the ten's complement of the correct answer with the carry-out pin equal to a one. The enabling software used with the circuitry 10 must, under these circumstances, change the sign of the output and then take the ten's complement of the intermediate answer to obtain the correct form of the result after subtraction. The ten's complement of a decimal string is carried out in circuitry 10 by (a) loading the source and destination data types over lines 72 and 74 with the data type of the destination digit; (b) loading the source latch 36 with the digit to be complemented; (c) loading the destination latch 34 with zero; and (d) setting the carry-in signal to a "one" and the ALU control lines to subtract. Thereafter, the correct form of the answer will appear at the outputs of the circuit.

Destination Latch Transfer

As noted above, the output of the multiplexor 90 over lines 168, as selected according to the ALU control signals, can be the digit stored in the destination latch. The transport of the digit from the destination latch 34 to lines 168 can occur in two different ways, the difference in procedures being the effect upon the result-equals-zero output over line 62. According to the first method, designated the "related transport mode", the output of the destination latch is transferred directly to the output lines 168 through the multiplexor 90. The destination output thus bypasses the ALU. In this operating mode, the result-equals-zero line 62 will equal a "one" if the destination latch output is zero. In the second operating mode, designated the "unrelated transport mode", the destination latch output is again selected by multiplexing element 90; however, in this instance the result-equals-zero signal over line 62 is forced to a "one" output, indicating a zero result, irrespective of the value in the destination latch. The selection of the related and unrelated transport modes and therefore the control of a zero detector 178, is established by the ALU control inputs over lines 110.

There results a decimal digit arithmetic circuit having sufficient flexibility to operate with equal facility upon strings of packed and/or unpacked data. Additions, subtractions, deletions, and other modifications of the invention will be obvious to those practiced in the art and are within the scope of the following claims.

What is claimed is:

1. Digital circuitry for performing arithmetic operations upon first and second binary coded decimal (BCD) digits comprising
   digital circuit means for receiving and storing
      said first BCD digit in a first data type format, and said second BCD digit in a second data type format,
      said first and second data type formats each being selected from the group of packed data and unpacked data,
   means for performing a said arithmetic operation upon said first and second stored BCD digits, to obtain a result data word, and
   output means responsive to the data type of said second BCD digit for outputting said result data word according to said second data type format.

2. Apparatus for performing arithmetic operations upon first and second binary coded decimal (BCD) digits comprising
   input means for selecting a data nibble from an input word having a plurality of nibbles,
   source means connected with said input means for storing a first said data nibble,
   destination means connected with said input means for storing a second said data nibble,
   means connected to said input means for specifying said first data nibble corresponding to a first BCD digit, and for specifying said second data nibble corresponding to a second BCD digit,
   said specifying means being responsive to at least a source input data type for specifying said first nibble and to at least a destination input data type for specifying said second nibble,
   arithmetic means for effecting a said arithmetic operation upon said first and second stored BCD digits, and
   output means responsive to the destination input data type for outputting a result of said arithmetic operation in accordance with the destination input data type.

3. The apparatus of claim 2 wherein said specifying means comprises
   a source nibble select counter,
   a destination nibble select counter,
   means for initializing said counters,
   means for incrementing each said counter according to a respective predetermined, data type dependent, transition sequence, and
   means responsive to at least outputs of said source and destination counters for specifying said first and second data nibbles respectively.

4. The apparatus of claim 3 further wherein said output means comprises
   a first tristate output driver,
   a second tristate output driver,
   a third tristate output driver, and
   means for selectively enabling each said output driver, said enabling means being responsive at least to said second data type and a high/low position signal indicating a digit slice position of the apparatus.

5. The apparatus of claim 4 wherein said output means further comprises
   a first output multiplexing means for providing an output to said first driver,
   a second output multiplexing means for providing an output to said second driver,
   a third output multiplexing means for providing an output to said third driver,
   means for controlling operation of said multiplexing means and responsive at least to
      signals designating operation of said arithmetic means, and
      signals designating the position of at least one of said first and second data nibbles.

6. The apparatus of claim 5 wherein
   said specifying means comprises means for generating a selection signal representative of a nibble to be transferred from an input word, and wherein said apparatus further comprises
   a transfer input element coupled to said specifying means and responsive to said selection signal for selecting a transfer nibble from said input word,
   a transfer latch for storing said selected transfer nibble,
   an arithmetic multiplexing element for selecting at least between an output of said arithmetic means and an output of said destination means, and
   each of said output multiplexing means having as inputs thereto at least
      (i) the output of said transfer latch, and
      (ii) an output of said arithmetic multiplexing element.

7. The apparatus of claim 6 wherein
   said arithmetic multiplexing element has as a further input, outputs of said source and destination counters, and
   said specifying means includes means responsive to at least arithmetic control signals and operating mode control signals for generating a signal specifying a selected input to be output by said arithmetic multiplexing means.

8. The apparatus of claim 6 further comprising
   a zone nibble generating element, and
   means for connecting said zone bit generating element to at least said first and second output multiplexing means.

9. Digit slice apparatus for performing arithmetic operations upon strings of binary coded digits, said apparatus comprising
   A. input means for accepting input operands having a plurality of digits to be operated on,
   B. clock means for generating clocking signals representative of a clock cycle,
   C. at least first and second arithmetic circuit elements, each element being connected with said input means and with said clock means, for operating upon strings of any one of packed, unpacked, and mixed data type arithmetic operands, each said arithmetic circuit element having a designated digit-selecting position,
   each said arithmetic circuit element further having
      i. means responsive to the digit-selecting position of the arithmetic circuit element for selecting digits from said input operands,
      ii. output line means for generating signals representative of output data, and
      iii. means for formatting the output data to correspond to the data type format of a specified input operand D. means for interconnecting at least two output line groups of said first circuit element with two output line groups of said second circuit element for providing a multidigit output word from said apparatus.

10. The apparatus of claim 9 wherein
the output line means of each said arithmetic circuit element comprises (M) output line groups, where (M) is a finite integer greater than or equal to two, and wherein each said arithmetic circuit element further comprises
means for selectively employing (N) said output line groups during one said clock cycle, said employed output line groups generating signals representative of output data, where (N) is a finite integer greater than one and less than (M).

11. The apparatus of claim 10 comprising
two said arithmetic circuit elements,
each of said arithmetic circuit elements including means for operating upon alternate digits of a digit string.

12. The apparatus of claim 11 wherein each said arithmetic circuit element further includes
counter means connected with said clock means for cycling through said input digit string in response to said clocking signals.

* * * * *